United States Patent [19]

Ogawa

[11] 3,756,132
[45] Sept. 4, 1973

[54] ADAPTER CIRCUIT FOR USE WITH AUTO EXPOSURE CAMERA

[75] Inventor: Francis T. Ogawa, Denver, Colo.

[73] Assignee: Honeywell Inc., Minneapolis, Minn.

[22] Filed: Aug. 11, 1972

[21] Appl. No.: 279,988

[52] U.S. Cl............................. 95/10 CE, 95/10 CT
[51] Int. Cl. ........................................... G03b 15/05
[58] Field of Search ...................... 95/10 CE, 10 CT

[56] References Cited
UNITED STATES PATENTS
3,568,582   3/1971   Uchida et al. ...................... 95/10 X Primary Examiner—Samuel S. Matthews
Assistant Examiner—Michael L. Geliner
Attorney—Arthur H. Swanson et al.

[57] ABSTRACT

An adapter circuit including a gating means is coupled to a light integrating automatic exposure control circuit of a camera to effect Flashing and Quenching operations of an associated Electronic Flash unit over a two wire connection therebetween. The adapter circuit precludes the transmission of a quench control signal from the camera to the Flash unit until after a predetermined time delay following a receipt of a Return signal, representative of a firing of the Flash unit, from the Flash Unit.

8 Claims, 5 Drawing Figures

ADAPTER CIRCUIT FOR USE WITH AUTO EXPOSURE CAMERA

Subject matter disclosed but not claimed herein is disclosed and claimed in the following copending applications: Ser. No. 108,876 by Francis T. Ogawa, filed Jan. 22, 1971; Ser. No. 108,878 by Francis T. Ogawa, filed Jan. 22, 1971; and Ser. No. 279,989 by Dennis J. Wilwerding filed on even date herewith.

The present invention relates generally to automatic exposure control circuitry and more particularly to an adapter circuit for transmitting flash control and quench control signals from an automatic exposure control camera to an electronic flash unit, via a two wire connection.

Automatic electronic shutter control or exposure control circuits are well known in the art. Such circuits respond to a selective actuation of a switching means, usually a shutter release switch of a camera, to open and/or hold open an exposure controlling device or shutter whereby to allow light from a scene being photographed to expose a light sensitive film within the camera. A light integrating means then measures the light being received from the scene being photographed, and generates a signal effective to close the exposure controlling device or shutter when a predetermined amount of light has been received. When the exposure controlling device is mechanical in nature, an appreciable time delay will elapse before the mechanical exposure terminating device completely terminates the exposure of the light sensitive film to the light from the scene being photographed in response to the exposure terminating signal generated by the light integrating means. When ambient light is insufficient to properly expose the light sensitive film, and auxiliary light is provided in the form of an electronic flash unit, the response time of the mechanical exposure controlling device is too slow to be effective. Hence, means must be provided to quench the light source. The so called computer flash photographic systems provide that requisite quenching means. However, where the light sensor is in the Camera, most computer flash systems have heretofore required a minimum of three wires connecting the camera and the flash unit. Since two wire cables and connections are of standard manufacture, a two wire system for coupling an electronically controlled shutter camera with a quenchable electronic flash unit is highly desirable. One such system is shown in FIG. 11 of U.S. Pat. No. 3,638,543 which issued to Isao Kondo on Feb. 1, 1972. While the Kondo circuit is generally of the two wire type, the quenching circuit portion thereof is susceptable to being falsely actuated by spurious noise signals. That susceptability is a definite shortcoming particularly in systems which provide an indication to a photographer when a quenching operation has occurred. The photographer assumes by such an indication that proper exposure has been accomplished. If the quenching operation is falsely initiated for example by noise signals, the photographer is misled into believing that a particular scene has been properly exposed when in fact it hasn't. The photographer will not discover his error until the film is developed, at which time it is at least inconvenient, if not impossible, to reconstruct that particular scene. Therefore, there is a need for an adapter or coupling circuit for coupling an electronically controlled shutter type camera to an electronic flash unit using only a two wire connection therebetween and which is substantially insensitive to noise signals otherwise operative to effect a false quenching operation of the flash system.

It is accordingly an object of the present invention to provide an adapter circuit which obviates the disadvantages of prior art apparatus.

It is another object of the present invention to provide an adapter circuit which couples an automatic electronic shutter camera with an electronic flash unit using a two wire only connection therebetween.

It is a further object of the present invention to provide an adapter circuit as set forth which significantly reduces the possibility of a noise signal effecting a false quenching of the Flash unit.

In accomplishing these and other objects, there has been provided, in accordance with the present invention, an adapter circuit which is coupled to an automatic exposure control circuit of a camera and connected to an associated electronic flash unit by a two wire connection means. A switching means associated with the camera is selectively actuated to open an exposure control device or shutter, thereby exposing a light sensitive film in the camera, and to generate a flash control signal which is transmitted over the two wire connection means to fire the flash unit. A Return signal representative of the firing of the flash unit is transmitted over the two wire connection means back to the adapter circuit. The light sensing circuit within the automatic exposure control circuit of the camera, generates a terminate signal, effective to close the exposure control device, when a predetermined amount of light has been received from the scene being photographed. The adapter circuit, responds to the terminate signal after a predetermined time delay following a receipt of the Return signal to effect the initiating of the quenching operation of the flash device.

A better understanding of the present invention may be had from the following detailed description, when read in connection with the accompanying drawings, in which.

Figure 1:
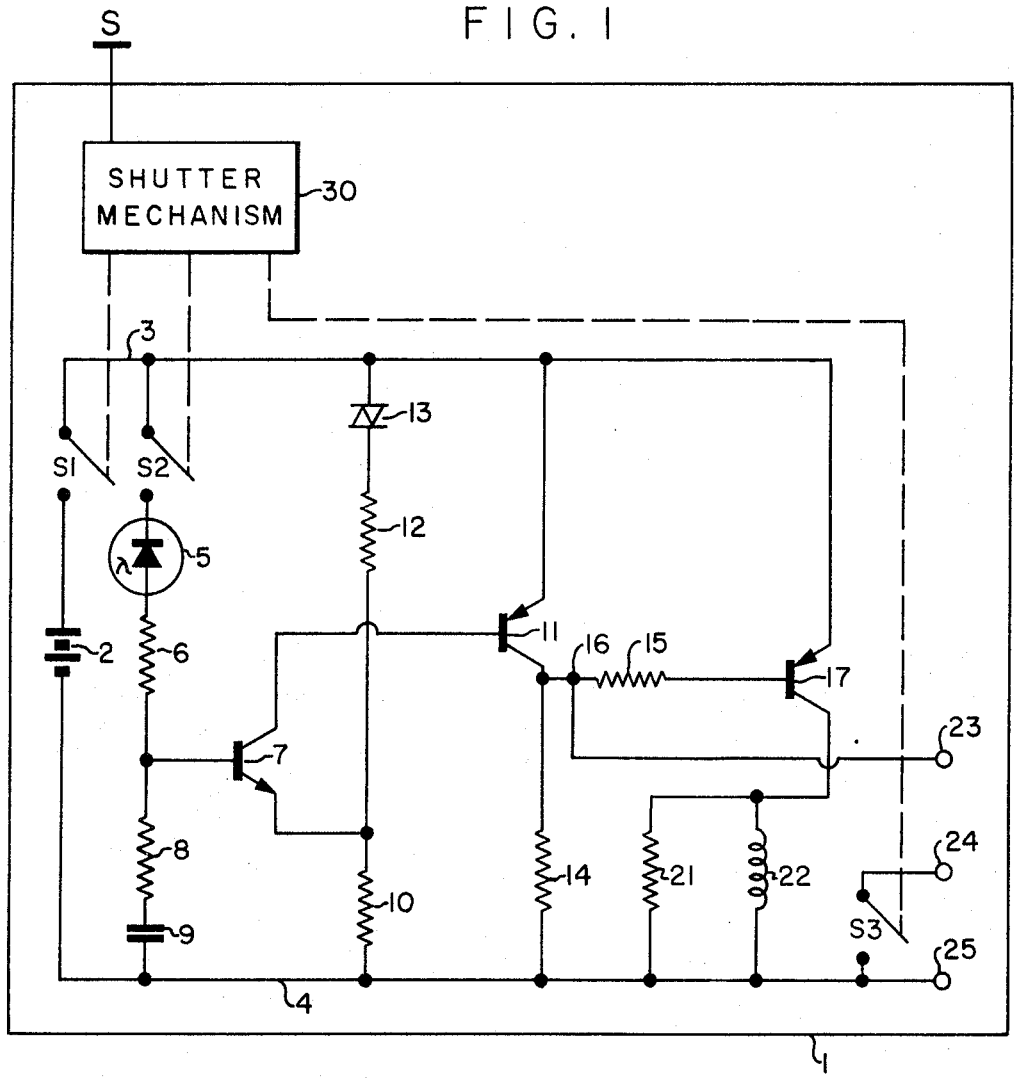
FIG. 1 is a schematic diagram of a typical automatic exposure control circuit of a camera.

Referring in detail to FIG. 1, there is shown a typical shutter control circuit 1 for an electronically controlled shutter camera. A power supply 2 has a positive terminal connected through a switching member S1 to a power lead 3. A negative terminal of the power supply 2 is connected to a reference lead 4. A switching member S2 connects the power lead 3 to one terminal of a light sensor 5, such as the silicon type, the other terminal of which is connected through a resistor 6 to the base terminal of a transistor 7. The base terminal of the transistor 7 is also connected through a resistor 8 to one terminal of a capacitor 9, the other terminal of which is connected to the reference lead 4. The emitter terminal of the transistor 7 is connected through a resistor 10 to the reference lead 4, while its collector terminal is connected to the base terminal of another transistor 11. The emitter terminal of the transistor 7 is also connected through a resistor 12 to one terminal of a diac 13, the other terminal of which connected to the power lead 3. The emitter terminal of the transistor 11 is connected to the power lead 3; its collector terminal is connected through a resistor 14 to the reference lead 4. The collector terminal of the transistor 11 is also connected to a point 16 and then through a resistor 15 to the base terminal of a transistor 17. The emitter terminal of the transistor 17 is connected to the power lead 3 and its collector terminal is connected through a parallel circuit comprising a resistor 21 and a shutter solenoid holding coil 22 to the reference lead 4. Another switching member S3 is also available in the shutter control circuit 1 to provide a contact closure between circuit output terminals 24 and 25 for coordinating external control circuits such as a flash device, with the operation of the shutter control circuit 1. A shutter mechanism 30 of the circuit 1 is actuated when an operator depresses a shutter release switch S. When the shutter release button S of the camera is depressed, switching members S1 and S2 are closed. Switching member S3 is closed when the shutter of the camera is fully open. The shutter solenoid coil 22 of the camera operates on the shutter mechanism in that when the coil 22 is energized the shutter is held open but when the coil 22 becomes de-energized, the shutter is allowed to close. Such shutter mechanisms are well known in the art as shown in U.S. Pat. No. 3,465,656 and British Pat. No. 1,265,819, for example, and a further explication of the mechanical details of the shutter mechanism 30 is therefore herein presented.

In operation when the shutter release switch S is actuated by a photographer, power is supplied between the power lead 3 and the reference lead 4. The light sensing device 5 in conjunction with the capacitor 9, begins to integrate the light received from a scene being photographed. The transistors 7 and 11 do not conduct after the closure of the switches S1 ad S2. The transistor 17 however begins to conduct when S2 is closed. The shutter solenoid holding coil 18 is energized thereby holding the shutter of the camera open. When the shutter is fully open, S3 closes. The closure of S3 may be effectively utilized to trigger an electronic flash unit connected to the output terminals 23, 24 and 25 of the shutter control circuit. When a predetermined amount of light has been integrated by the light sensing device 5 and the integrating capacitor 9, the transistor 7 will become forward biased and begin to conduct current therethrough. Conduction through the transistor 7, in turn, causes the transistor 11 to turn on thereby back biasing the transistor 17 and terminating conduction therethrough. When the transistor 17 turns off, the the shutter solenoid coil 22 is denergized and the shutter is allowed to close thereby blocking any further exposure of a light sensitive film in the camera by light received from the scene being photographed. It is noted that when the light integrating means of the camera has received sufficient light to properly expose a light sensitive film in the camera positive going and gegative going signals with respect to the reference lead 4 are generated within the shutter control circuit 1 of the camera. One positive going signal appearing at the collector terminal of the transistor 11 and one negative signal appears at the collector terminal of the transistor 17. Either of these signals inter alia, may be designated as a terminate signal since the appearance of either signifies that the proper amount of light has been received by the camera for correct exposure of the film and that therefore further exposure of the light sensitive film may be terminated. The terminate signal appearing at the collector of the transistor 17 is applied to the output terminal 23 and may be used to initiate the quenching operation of a connected electronic flash unit.

Figure 2:
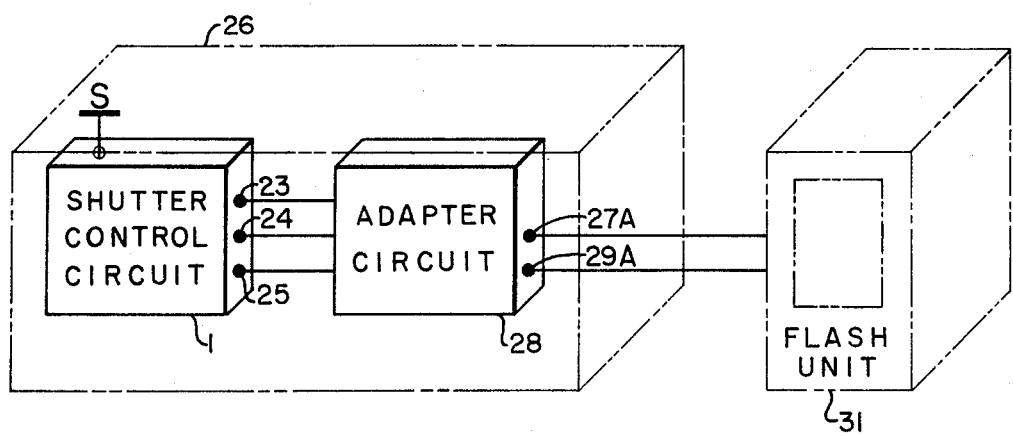
FIG. 2 is a schematic diagram of a computer flash system using the adapter circuit of the present invention.

FIG. 2 shows the 3 wire to 2 wire adapter circuit of the present invention as it is connected in a computer-flash system using the automatic shutter control circuit 1 of an auto-exposure camera 26 and an electronic flash unit 31. The three output terminals 23, 24 and 25 of the shutter control circuit 1 are connected to the input of an adapter circuit 28. The adapter circuit 28 has two output terminals 27A and 29A for providing a connection to the electronic flash unit 31.

Figure 3:
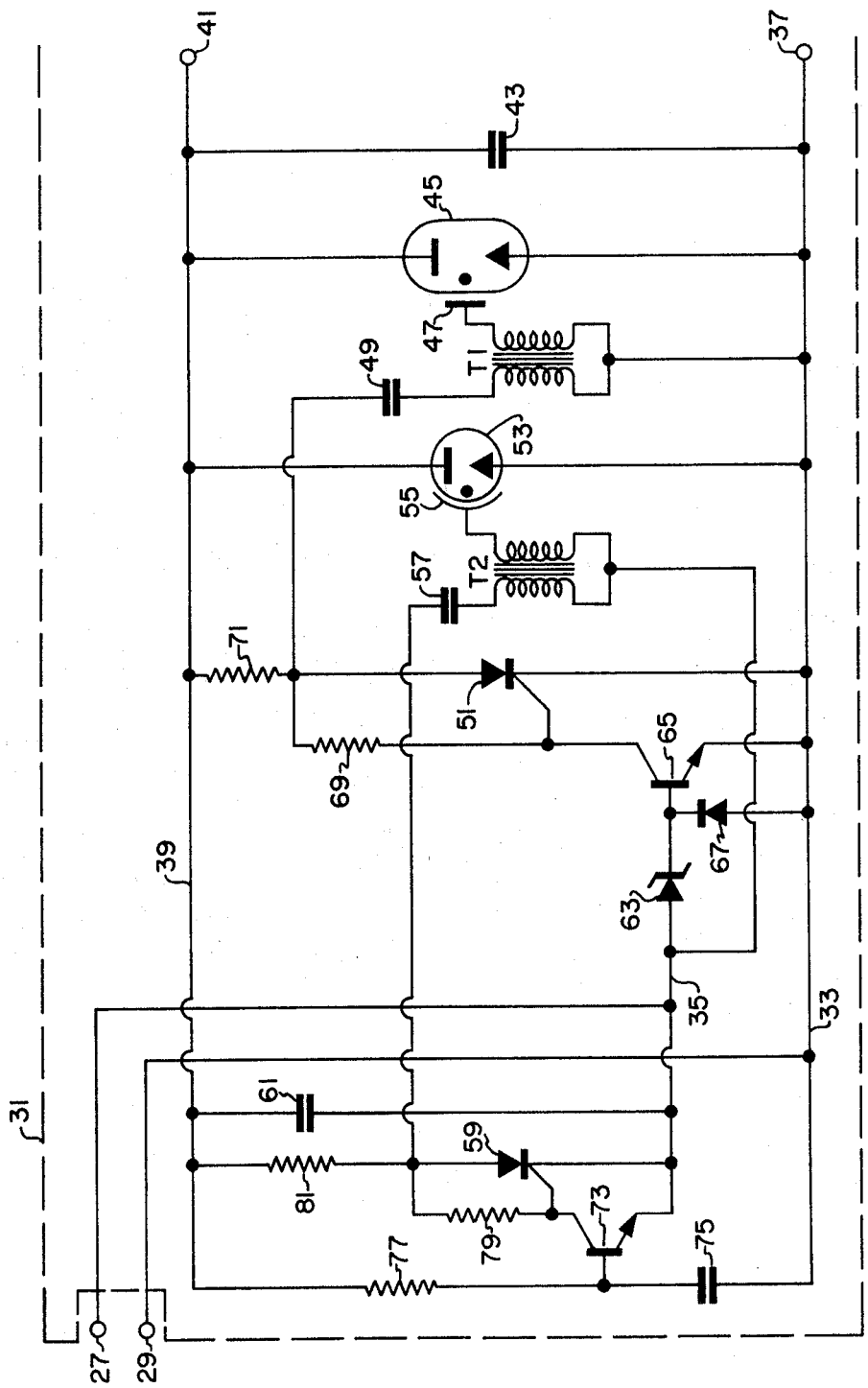
FIG. 3 is a schematic diagram of an electronic Flash unit which may be used with the present invention.

A suitable flash unit 31 which has a pair of input or control terminals for connection to a two wire transmission line is shown schematically in FIG. 3. In pursuance of the advantages of the two wire system, there is shown in FIGS. 4 and 5, various embodiments of a three wire-to-two wire adapter or coupling circuit (which will be discussed in detail hereinafter) which may be used in conjunction with the electronic shutter control circuit 1 of FIG. 1, or other similar electronic shutter control circuits, to render the flash unit of FIG. 3 compatible therewith.

In FIG. 3, there is shown the flash unit 31 having two input terminals 27 and 29. The input terminal 29 is connected to a flash unit ground bus 33; the input terminal 27 is connected to a control signal bus 35. The flash unit ground bus 33 is connected to a terminal 37. A high voltage bus 39 of the flash unit 31 is connected to a terminal 41. A storage capacitor 43 is connected between the terminals 37 and 41. The terminals 37 and 41 are provided for connection to the usual capacitor charging means which is not shown in FIG. 3. Such capacitor charging means are well known in the art, and it is sufficient to say that the capacitor 43 is normally maintained in a charged state by the aforementioned capacitor charging means whereby, a relatively high voltage is maintained across the capacitor 43. A flash or light producing tube 45 is shown with its anode connected to the high voltage bus 39 and its cathode connected to the ground bus 33. A light triggering terminal 47 of the flash tube 45 is coupled through a transformer T1 to one terminal of a capacitor 49. The other terminal of the capacitor 49 is connected to the anode terminal of a silicon controlled rectifier (SCR) 51. The common terminal of the transformer T1 is connected to the bus 33. A light terminating or quench tube 53 is shown connected between the high voltage bus 39 and the groud bus 33. A quench tube triggering terminal 55 is connected through a transformer T2 to one terminal of a capacitor 57. The other terminal of the capacitor 57 is connected to the anode terminal of a second SCR 59. The common terminal of the transformer T2 is connected to the control signal bus 35. A capacitor 61 connects the high voltage bus 39 with the control signal bus 35. The control signal bus 35 is connected to the anode terminal of a Zener diode 63. The cathode terminal of the zener diode 63 is connected to a common point between the base terminal of an NPN transistor 65 and the cathode terminal of a diode 67. The anode terminal of the diode 67 is connected to the ground bus 33. The collector terminal of the transistor 65 is connected through a resistor 69 to the anode terminal of the SCR 51. The high voltage bus 39 is connected to the anode terminal of the SCR 51 through a resistor 71. The gate terminal of the SCR 51 is connected to the collector terminal of the transistor 65, and the cathode terminal of the SCR 51 is connected to the ground bus 33. The emitter terminal of the transistor 65 is also connected to the ground bus 33. The control signal bus 35 is connected to the emitter terminal of an NPN transistor 73. The base terminal of the transistor 73 is connected through a capacitor 75 to the ground bus 33. The base terminal of the transistor 73 is also connected through a resistor 77 to the high voltage bus 39. The collector terminal of the transistor 73 is connected through two resistors 79 and 81 to the high voltage bus 39. The common point between the two resistors 79 and 81 is connected to the anode terminal of the SCR 59. The gate terminal of the SCR 59 is connected to the collector terminal of the transistor 73. The cathode terminal of the SCR 59 is connected to the control signal bus 35.

In operation, the capacitor 49 of the flash unit 31 is charged from the high voltage bus 39 through the resistor 71. The capacitor 57 of the flash unit 31 is similarly charged from the high voltage bus 39 through the resistor 81. The transistor 73 is so biased that it is normally conducting, in a steady state condition. The transistor 65 is similarly so biased that it is normally conducting. With the transistor 73 conducting, the gate terminal of SCR 59 is shorted to its cathode terminal and the SCR 59 is therefore nonconductive. Similarly, with the transistor 65 conducting, the gate terminal of the SCR 51 is effectively clamped to its cathode terminal thereby precluding conduction therethrough. When an actuating switching means, for example the shutter release switch S and shutter mechanism 30 of an associated camera 26, effects a contact closure between the terminals 27 and 29 of the flash unit 31, the potential of the control signal bus 35 will decrease with respect to the potential ground bus 33, since a lower resistance path between the control signal bus and the ground bus is provided by the contact closure than would otherwise be available through the Zener diode 63 and the base emitter path of the transistor 65. The reduced potential on the control signal bus 35 with respect to the round bus 33, will cause the transistor 65 to turn off. With the transistor 65 nonconducting, a current will flow through the resistor 69 and into the gate terminal of the SCR 51, thereby rendering it conductive. With the SCR 51 conducting, the relatively low resistance path thereby presented, rapidly discharges the capacitor 49, whereby to trigger the flash tube 45. As the flash tube 45 begins to conduct, the voltage on the high voltage bus 39 is suddenly reduced as the charge on the capacitor 43 is dumped through the flash tube 45. That sudded voltage decrease appearing at the high voltage bus 39 is coupled through the capacitor 61 to the control signal bus 35. The coupling action of the capacitor 61 causes the voltage on the control signal bus 35 to suddenly decrease to a negative value with respect to that of the ground bus 33; and therefore, the potential at the terminal 27 will go negative with respect to the potential at the terminal 29. That change in potential is designated as the Return signal for reasons hereinafter discussed. At this point in the operation of the flash unit 31, the flash tube 45 is heavily conducting thereby giving off light for the illumination of a scene being photographed. The next action of the flash unit 31 occurs when a remote light sensing unit, which senses light received thereby from the scene being photographed, determines that sufficient light has been received to properly expose the light sensitive film in the camera. At that time, a second effective contact closure is provided by the associated camera means. That second contact closure is effective to again reduce the potential difference between the control signal bus 35 and the ground bus 33 of the flash unit 31. That potential difference decrease is coupled through the capacitor 75 to the base terminal of the transistor 73 thereby causing the transistor 73 to cease conduction. With the transistor 73 nonconducting, a current will flow into the gate terminal of the SCR 59 thereby rendering it conductive. When the SCR 59 becomes conductive, a lower resistance discharge path is presented across the capacitor 57 of the flash unit 31 which causes the capacitor 57 to dump its charge. That action induces a triggering signal to appear at the quench tube triggering terminal 55 thereby initiating conduction in the quench tube 53. The dumping of the charge on the capacitor 57 produces a ringing action through the circuit comprising the capacitor 57, the SCR 59, and the transformer T2. That ringing action is effective to turn off the SCR 59 after the quench tube triggering signal has been provided. After being triggered, the quench tube 53 conducts much more heavily than the flash tube 45 and provides an effective short circuit across the capacitor 43. The residual charge on the capacitor 43 of the flash unit 31 will then rapidly dissipate to a point where the voltage on the high voltage bus 39 is insufficient to support ionization in either the quench tube 53 or the flash tube 45 at which time both tubes will cease conduction. The charging circuit connected to the terminals 41 and 37 of the light producing means or flash unit 31 will then begin to recharge the capacitor 43. The voltage appearing at the high voltage bus 39 will build up to a value sufficient to restore the biasing voltage required to turn on the transistors 65 and 73 and the flash unit 31 of FIG. 3 will be returned to its steady state condition to await the initiation of another cycle. It should be noted that the potential at the terminal 27 of the flash unit 31 is initially of a greater magnitude than the potential at the terminal 29. When an effective contact closure from an external circuit is applied thereacross, the flash unit 31 becomes operative thereby providing light to illuminate a scene to be photographed. At that time, a Return signal representative of the fact that the flash unit 31 is operative appears at the input terminals 27 and 29 in the form of a polarity reversal, i.e. the potential at the terminal 27 will go negative with respect to the potential at the terminal 29 when the flash tube 45 begins to conduct. Thereafter, a second contact closure, provided by an external circuit and representative of the fact that sufficient light has been received from a scene being photographed to properly expose a light sensitive film in an associated camera, is applied across the input terminals 27 and 29 of the flash unit 31. That second effective contact closure, which may be referred to as a quench control signal, is operable to terminate conduction in the flash tube 45 thereby terminating its light producing function.

Figure 4:
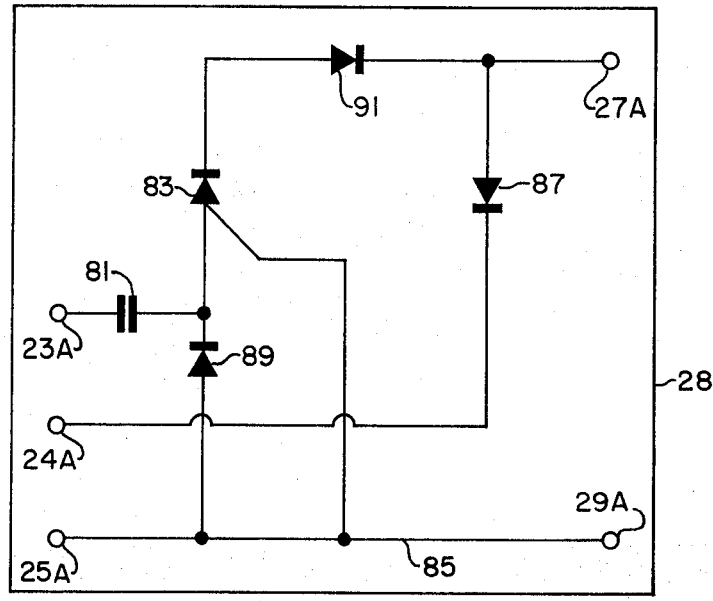
FIG. 4 is a schematic diagram of one embodiment of the present invention.
Figure 5:
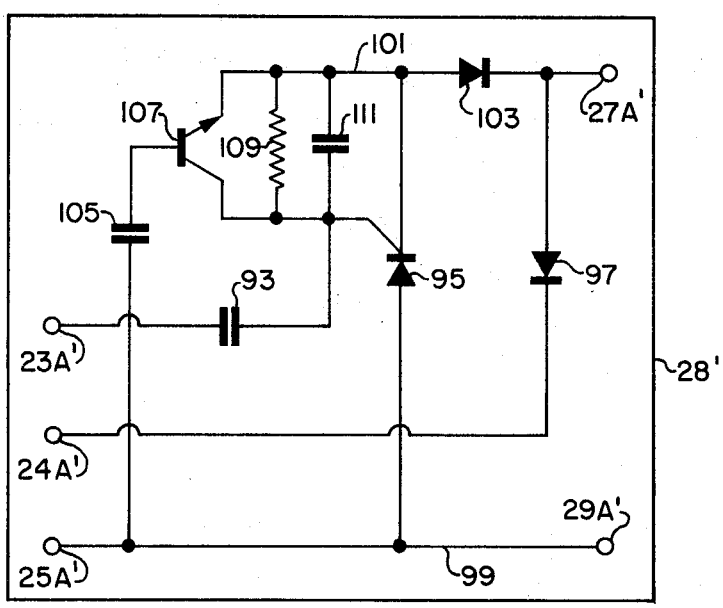
FIG. 5 is a schematic diagram of another embodiment of the present invention.

In FIG. 4, a three wire to two wire adapter circuit is shown for interconnecting the automatic electronic shutter control circuit of FIG. 1 with the electronic flash unit of FIG. 3. A coupling means or capacitor 81 connects an input terminal 23A of the adapter 28 to an anode terminal of a programable unijunction transistor (PUT) 83. Another input terminal 25A is connected to one output terminal 29A by a lead 85. A first diode means 87 has its anode terminal connected to another output terminal 27A and its cathode terminal connected to another input terminal 24A. The anode terminal of the PUT 83 is connected to the cathode terminal of a second diode means 89, the anode terminal of which is connected to the lead 85. The control terminal of the PUT 83 is connected to the lead 85, and the PUT cathode terminal is connected to the first output terminal 27A through the anode to cathode path of another diode 91. The shutter control circuit of FIG. 1 is connected to the adapter circuit of FIG. 4 by connecting terminals 23, 24, and 25 of FIG. 1 with the terminals 23A, 24A, and 25A, respectively, of FIG. 4. The adapter circuit is connected to the electronic flash unit 31 by connecting the adapter output terminals 27A and 29A to the flash unit input terminals 27 and 29, respectively.

When the shutter release switch S of FIG. 1 is actuated, and after the shutter of the camera is fully open, the switch S3 closes thereby providing a first effective contact closure or short circuit between the output terminals 27A and 29A of the adapter circuit 28. That first effective contact closure, as hereinbefore explained, when detected at the flash unit 31, will initiate conduction in the flash tube 45 thereby providing light for the illumination of the scene being photographed. Thereafter, when the potential at the terminal 27 of the flash unit 31 decreases with respect to the potential at the terminal 29, the diode 87 becomes reversed biased thereby decoupling the initial contact closure provided by the switching member S3, from the flash unit 31. That decrease in potential at adapter terminal 27A with respect to the potential at the adapter terminal 29A is designated as a Return signal and is effective to forward bias the anode to cathode junction of the PUT 83. The forward biasing of the PUT 83 would ordinarily enable the PUT 83 to become conductive upon a subsequent receipt of a negative going signal applied to the gate terminal of the PUT 83 with respect to the anode terminal thereof, or positive going signal applied to the anode terminal of the PUT 83 with respect to the gate terminal thereof. However, in the present example, after the PUT 83 is enabled by the Return signal, the capacitor 81 will begin to charge through the diode 89 and the potential drop across the diode 89 while the capacitor 81 is charging represents a swamping signal which holds the anode terminal of the PUT 83 more negative than its gate terminal thereby attenuating the triggering ability of the PUT 83 until the capacitor 81 has been fully charged. The swamping signal, i.e., the signal appearing between the anode and gate terminals of the PUT 83 while the capacitor 81 is being charged through the diode 89, in the present example, takes the form of an RC curve and the responsiveness of the PUT 83 to a subsequent triggering signal will be varyingly attenuated for a predetermined delay time until the capacitor 81 is charged. Therefore, immediately following the generation of a Return signal, the responsiveness of the PUT is attenuated greatly by the swamping signal, and that responsiveness will gradually increase as the capacitor 81 charges, until the capacitor 81 is fully charged at which time the swamping signal no longer exists, and the normal responsiveness of the PUT 83 to become conductive upon receipt of a subsequently applied trigger signal, is completely restored. By so attenuating the responsiveness of the PUT 83, the adapter circuit 28 is rendered substantially immune to various spurious signals which might otherwise effect a false quenching of the flash tube. However, after the capacitor 81 has been fully charged through the diode 89, the subsequent application of the terminate signal across the input terminals 23A and 25A of the adapter circuit 28 is effective to provide the second effective contact closure or short circuit between the output terminals 27A and 29A. As hereinbefore explained, the terminate signal is generated by the shutter control circuit 1 when sufficient light has been received thereby to indicate proper exposure of the light sensitive film in the camera. The terminate signal appears in the form of a positive going potential at the terminal 23A with respect to the potential at terminal 25A. The terminate signal is effective to back bias the diode 89, thereby decoupling the anode terminal of the PUT 83 from the lead 85. At the same time the terminate signal forward biases the anode to gate junction of the PUT 83 is forward thereby rendering it conductive to provide the second effective contact closure between the output terminal 27A and 29A. The predetermined time delay, during which the responsiveness of the PUT 83 is attenuated, is short relative to the minimum anticipated time delay occurring between the activation of the light integrating circuit and the generation of the light sufficiency or terminate signal by the shutter control circuit 1 of FIG. 1.

In FIG. 5, another adapter circuit is shown which is also substantially immune to spurious signals which might otherwise falsely actuate the quenching operation of a connected electronic flash unit. An input terminal 23A' is connected through a capacitor 93 to the gate terminal of a silicon controlled rectifier (SCR) 95. A second input terminal 24A' is connected through the cathode to anode path of a diode 97 to a first output terminal 27A' of the adapter 28'. A third input terminal 25A' is connected by a lead 99 to a second output terminal 29A' of the adapter 28'. The anode terminal of the SCR 95 is connected to the lead 99 and its cathode terminal is connected to another lead 101. The lead 101 is connected to the anode terminal of a diode 103, the cathode terminal of which is connected to the first output terminal 27A'. The third input terminal 25A' is connected through a capacitor 105 to the base terminal of an NPN transistor 107. The emitter of the transistor 107 is connected to the lead 101 and its collector terminal is connected to the gate terminal of the SCR 95. Also connected between the lead 101 and the gate terminal of the SCR 95, is a parallel combination of a resistor 109 and a capacitor 111. The control circuit of FIG. 1 is connected to the adapter 28' of FIG. 5 by connecting the terminals 23, 24, and 25 of the control circuit with the input terminals 23A', 24A' and 25A', respectively of the adapter circuit 28'. The flash unit 31 is connected to the adapter 28' of FIG. 5 by connecting the terminals 27 and 29 of the flash unit 31 with the terminals 27A' and 29A', respectively, of the adapter 28'.

In operation, after an operator has actuated the shutter release switch S, and the shutter is fully open, the switching member S3 closes thereby effecting the first contact closure or short circuit across the output terminals 27A' and 29A' of the adapter circuit 28' of FIG. 5. As hereinbefore explained in connection with FIG.

3 that first contact closure is effective to fire the flash unit 31. When the flast unit 31 is fired, the Return signal is generated thereby and appears across the terminals 27A' and 29A' of the adapter circuit 28'. The Return signal is in the form, of a negative going potential at the terminal 27A' with respect to the potential at the terminal 29A'. That negative going potential or Return signal forward biases the SCR 95. The SCR 95 would then ordinarily be enabled to receive a subsequent triggering signal to render it conductive. However, in the present example, the responsiveness of the SCR 95 is attenuated after the receipt of the Return signal since the Return signal causes the transistor 107 to become conductive thereby effectively clamping the gate and cathode terminals of the SCR 95, together at the same potential. Therefore, while the transistor 107 is conductive, a noise signal appearing at the input terminal 23A', which otherwise might be operative to render the SCR 95 conductive, is rendered ineffective. The transistor 107 will remain conductive, and thereby attenuate the responsiveness of the SCR 95, until the capacitor 105 has discharged through the base emitter junction of the transistor 107 to a point whereat the potential difference between the base terminal and emitter terminal of the transistor 107 is insufficient to forward bias the base-emitter junction thereof; the transistor 107 will then be rendered non-conductive. When the transistor 107 becomes non-conductive, the gate terminal of the SCR 95 is no longer clamped to its cathode terminal, and is thereafter responsive to a trigger signal applied to the input terminal 23A' of the adapter 28' to render the SCR 95 conductive. In the present example, that trigger signal is the terminate signal which is generated by the auto exposure control circuit of FIG. 1. When the SCR 95 becomes conductive, the second effective contact closure or short circuit is provided between the terminals 27A' and 29A' as was hereinbefore explained.

The circuit of FIG. 5 differs from that of FIG. 4, in that, in the case of FIG. 5, during the predetermined time delay (the time delay during which the capacitor 105 discharges through the transistor 107), the gate terminal and the cathode terminal of the SCR 95 are effectively clamped at the same potential. In the case of FIG. 4, on the other hand, during the predetermined time delay (the time during which the capacitor 81 discharges through the diode 81), a swamping signal of a decaying magnitude, is applied to back bias the anode gate terminals of the PUT 83. When the predetermined time delay has elapsed, no significant potential difference appears across the diode 89 and the swamping signal no longer exists. The circuits of both FIG. 4 and 5 substantially preclude spurious signals which may appear immediately following the generation of the Return signal, from falsely initiating a quenching operation of the flash unit 31. At the same time, they maintain a desired degree of responsive to the expected terminate signal to initiate the quenching operation upon a receipt thereof. Since the coupling circuit can only transmit the quench control signal to the flash unit after it has received the Return signal, the adapter circuits 28 and 28' are also insensitive to noise signals appearing at the input terminals before the receipt of the Return signal at its output terminals.

Thus there has been provided in accordance with the present invention, an adapter circuit for coupling an automatic exposure control camera circuit to an electronic flash unit, using a two wire only connection there between, and which significantly attenuates the possibility of a false quenching operation both before the firing of the flash unit and also for predetermined time delay thereafter.

The embodiments of the invention in which an exclusive property or privilege is claimed are defined as follows:

1. The combination comprising:
a controllable electronic flash unit; and
a light sensitive assembly for use in association with a camera having a shutter mechanism, said light sensitive assembly comprising:
first and second output terminals for connection to said controllable electronic flash unit;
means responsive to an actuation of the shutter mechanism of the camera for providing a first effective short circuit across said first and second output terminals whereby to initiate an operation of the electronic flash unit;
means responsive to the actuation of said flash unit to effectively open circuit said first and second output terminals;
light sensitive means responsive to light received from a scene to be photographed to produce an electrical signal representative of the intensity of said light received;
integrating means responsive to said electrical signal to produce an integral signal representative of the integral of the light received;
means responsive to the actuation of the shutter mechanism to enable operation of said light sensitive means and said means responsive to a predetermined magnitude of said integral signal to provide a terminate signal; and
gating means responsive to said terminate signal to provide a second effective short circuit across said first and second output terminals; said gating means including delay means responsive to the actuation of the flash unit, said delay means being operative to attenuate, for a predetermined time delay following the actuation of the flash unit, the responsiveness of said gating means to spurious signals tending to falsely actuate said gating means, said second effective short circuit being operative to initiate the termination of the operation of said flash unit 2. A light sensitive assembly for use in association with a camera having a shutter mechanism, said light sensitive assembly comprising:
first and second output terminals for connection to a controllable electronic flash unit;
means responsive to an actuation of the shutter mechanism of the camera for providing a first effective short circuit across said first and second output terminals whereby to initiate actuation of the electronic flash unit;
means responsive to the actuation of the flash unit to effectively open circuit said first and second output terminals;
light sensitive means responsive to light received from a scene to be photographed to produce an electrical signal representative of the intensity of the light received;
integrating means responsive to said electrical signal to produce an integral signal representative of the integral of the light received;

means responsive to the actuation of the shutter mechanism to enable operation of said light sensitive means and said integrating means;

means responsive to a predetermined magnitude of said integral signal to provide a terminate signal; and gating means responsive to said terminate signal to provide a second effective short circuit across said first and second output terminals, said gating means including delay means responsive to the actuation of the flash unit, said delay means being operative to attenuate, for a predetermined time delay following the actuation of the flash unit, the responsiveness of said gating means to spurious signals tending to falsely actuate said gating means, said second effective short circuit being operative to initiate the termination of the operation of the flash unit.

3. An adapter for interfacing a controllable electronic flash unit with a camera having an electronically controlled shutter assembly includes light sensitive means responsive to light received from a scene to be photographed to produce an electrical signal representative of the intensity of the light received, integrating means responsive to said electrical signal to produce an integral signal representative of the integral of the light received, means responsive to a predetermined magnitude of said integral signal for generating a terminate signal, a shutter mechanism, and means responsive to an actuation of the shutter mechanism to enable an operation of the light sensitive means and the integrating means, said adapter comprising;

first and second output terminals for connection to the electronic flash unit;

means responsive to the actuation of the shutter mechanism for providing a first effective short circuit across said first and second output terminals whereby to initiate an operation of said electronic flash unit;

means responsive to the actuation of the flash unit to effectively open circuit said first and second output terminals;

gating means responsive to said terminate signal to provide a second effective short circuit across said first and second output terminals; said gating means including delay means responsive to the actuation of the flash unit, said delay means being operative to attenuate, for a predetermined time delay following the actuation of the flash unit, the responsiveness of said gating means to spurious signals tending to falsely actuate said gating means, said second effective short circuit being operative to initiate the termination of the operation of the flash unit.

4. The adapter as set forth in claim 3 wherein all the power for said adapter is applied through first and second output terminals.

5. The adapter as set forth in claim 3 wherein said delay means includes means for providing a substantially contstant attenuation of said responsiveness of said gating means during said predetermined time delay.

6. The adapter as set forth in claim 3 wherein said delay means includes means for providing a time varying attenuation of said responsiveness of said gating means during said predetermined time delay.

7. The adapter as set forth in claim 3 wherein said adapter includes:

first, second, and third input terminals arranged for connection to said camera, said third input terminal being connected to said second output terminal;

a programmable unijunction transistor (PUT) having anode, cathode, and gate terminals, said PUT cathode terminal being connected to said first output terminal, and said PUT gate terminal being connected to said third input terminal;

a first diode means having anode and cathode terminals connected to first output terminal and said second input terminal, respectively;

a second diode means having anode and cathode terminals connected to said third input terminal and said PUT anode terminal, respectively; and a coupling means connecting said "first" input terminal with said PUT anode terminal; and 8. The adapter as set forth in claim 3 wherein said adapter includes;

first, second, and third input terminals arranged for connection to said camera, said third input terminal being connected to said second (output terminal;

a silicon controlled rectifier (SCR) having anode, cathode and gate terminals, said SCR anode and cathode terminals connected to said second and first output terminals, respectively; switching means having first, second, and third terminals, said first and second terminals of said switching means being connected to said SCR cathode and gate terminals, respectively; first coupling means connecting said third terminal of said switching means with said third input terminal;

second coupling means connecting said SCR gate terminal to said first input terminal; and first diode means having anode and cathode terminals thereof connected to said first output terminal and said second input terminal, respectively.

* * * * *